United States Patent
Abert et al.

[19]

[11] Patent Number: 5,617,309
[45] Date of Patent: Apr. 1, 1997

[54] CONFIGURATION FOR DATA TRANSFER WITH A PARALLEL BUS SYSTEM

[75] Inventors: Michael Abert, Au; Siegfried Block, Kandel; Johannes Bozenhardt; Franz Leigsnering, both of Ettlingen; Werner Pfatteicher, Pfinztal; Franz-Clemens Schewe, Karlsruhe, all of Germany

[73] Assignee: Siemens Aktiengesellschaft, Munich, Germany

[21] Appl. No.: 424,381

[22] PCT Filed: Oct. 29, 1993

[86] PCT No.: PCT/DE93/01037

§ 371 Date: May 4, 1995

§ 102(e) Date: May 4, 1995

[87] PCT Pub. No.: WO94/10631

PCT Pub. Date: May 11, 1994

[30] Foreign Application Priority Data

Nov. 4, 1992 [DE] Germany ............... 42 37 259.3

[51] Int. Cl.⁶ ......................................... G06F 19/00
[52] U.S. Cl. ................. 364/133; 364/140; 395/285; 395/831
[58] Field of Search ............... 364/131, 132, 364/133, 134, DIG. 1 MS File, DIG. 2 MS File; 395/200.14, 200.19, 200.02, 285, 286, 831; 340/825.06, 825.07, 825.08, 825.14, 825.2, 825.21, 825.54

[56] References Cited

U.S. PATENT DOCUMENTS

| | | | |
|---|---|---|---|
| 4,128,883 | 12/1978 | Duke et al. | 395/285 |
| 4,310,896 | 1/1982 | Cutler et al. | 395/285 |
| 4,710,871 | 12/1987 | Belknap et al. | 395/200.14 |
| 5,070,443 | 12/1991 | Priem et al. | 395/285 |

Primary Examiner—Joseph Ruggiero
Attorney, Agent, or Firm—Kenyon & Kenyon

[57] ABSTRACT

A configuration for data transfer with a parallel bus system including an address bus, a data bus and a control bus and with several units interfacing with them. A first control line is used to send an acknowledge signal with which one or more units addressed by a first unit acknowledge accesses in access cycles. A second control line is used to detect addressing errors and accesses to non-existing units and to carry a signal ready control signal to the first unit from the others indicating whether one of the interfaced units was addressed. To do so, the signal ready control signal has dominant and recessive states. During an access cycle, only addressed units generate a dominant state. The control signal is also used for synchronous multipoint access. The invention can be used in bus systems.

7 Claims, 1 Drawing Sheet

CONFIGURATION FOR DATA TRANSFER WITH A PARALLEL BUS SYSTEM

BACKGROUND OF THE INVENTION

The present invention concerns a configuration (system) for data transfer with a parallel bus system which includes an address bus, a data bus, and a control bus, and several units interfacing with them.

Such a configuration is proposed in German Patent Application No. P 41 21 152.9. The units are plugged into a subrack. During an access cycle, one of the units, as a processing unit, accesses one of the other units in an address-controlled read or write mode. In a disturbance-free access, the access cycle is completed with an acknowledge signal sent to the processing unit. In automation devices, the units can be configured, for example, as central modules, input or output modules, communication processors, or interface modules. The subrack of an automation device has, on its backplate (backplane), one or more bus cards for electrically connecting the units into the slots. The central module, which processes a control program for solving an automation problem, accesses other modules through this backplate (backplane) bus in the read or write mode, which modules end the access with a "Ready" acknowledge signal if the access was successfully completed. The access time is monitored by a timer of the central module. If the timer operating time is completed without the central module having received an acknowledge signal, it aborts the attempted access. An automation device for more complex automation tasks often consists of a central unit and a plurality of expansion units connected thereto. The operating time of the timer used for monitoring the accesses to non-existing or defective units must be set to the longest access time of the automation device plus a safety margin to safely disregard erroneous responses. Therefore the time for recognizing an access error (QVZ=Acknowledge delay) by time measurement is always greater than the maximum time of an error-free access. In addition, setting the timer is a complex problem because the access times depend on several parameters. The QVZ time should not be set too long, since it determines the duration of the bus occupancy and impairs system performance.

The acknowledge process described above is suitable for a "point-to-point" link, i.e., for data transfer from one unit to another.

Acknowledgment-controlled transfer between a unit and several other addressed units is, however, not possible, since the acknowledge signal of the fastest-responding unit is dominant and masks the time that any later acknowledge signals appear. Therefore, the latest acknowledgment cannot be detected. Transfer of data to several units must be time controlled with the time base of the order of magnitude of the aforementioned QVZ time. The time required to access several units is therefore longer than the maximum required time for a point-to-point access.

The goal of the present invention is to provide a configuration for data transmission with a parallel bus system allowing time-optimized access interruption to a non-acknowledging address, as well as an acknowledge-controlled access to several units simultaneously.

SUMMARY OF THE INVENTION

To achieve the above mentioned goal, the present invention provides a novel system for data transfer with a parallel bus system including an address bus, a data bus, and a control bus, the system including a plurality of units, a first control line and a second control line. The first control line interfaces with several units and transmits an acknowledge signal. One or more of the units addressed by a first unit use the acknowledge signal to acknowledge access during access cycles. The second control line transmits a control signal having a dominant state and a recessive state. Other units use the control signal to indicate to the first unit whether an interfacing unit is being addressed. All units generate a dominant state outside of the access cycle. However, only the addressed units generate the dominant state during the access cycles.

In a preferred embodiment of the present invention, the acknowledge signal has a dominant state and a recessive state and the addressed units generate a dominant state as an acknowledgement during the access cycles and generate a recessive state in other instances.

The units may be modules in a subrack. In such a system, the second control line may run to all the subracks.

The system may also include modules that cannot generate a control signal. These modules are connected to the bus system through an adaptation device which generates a control signal for maintaining the dominant state when an acknowledgement appears and otherwise assumes the recessive state with a delay at least equal to the longest duration of an access cycle.

The second control line may be provided with a pull-up resistor wherein the units are connected to the second control line with an open collector output.

The configuration of the present invention may be used as a component in an automation device.

BRIEF DESCRIPTION OF THE DRAWINGS

The present invention, its embodiments and advantages are described in detail using the drawings that illustrate an exemplary implementation of the present invention.

DETAILED DESCRIPTION

Figure 1:
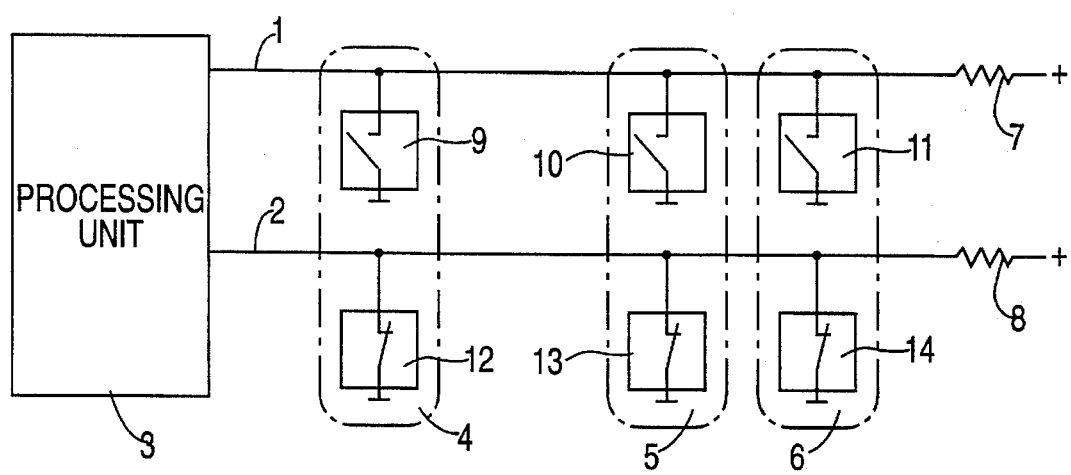
FIG. 1 is a block diagram of a configuration of the present invention.

In FIG. 1, a first control line 1 and a second control line 2, connected to four units 3, 4, 5, and 6, are brought to high level through pull-up resistors 7 and 8, respectively. Unit 3 (a processing unit) analyzes the level on the first control line 1 as a "Ready" acknowledge signal and the level on the second control line 2 as an SR (System Ready) control signal. The Ready acknowledge signal can be set to low level by closing any one of switches 9, 10, and 11. Similarly, the control signal SR in units 4, 5, and 6 can be set to low level by closing any one of switches 12, 13 and 14. In the idle state, switches 9, 10, and 11 of the Ready acknowledge signal are all open and the first control line 1 is therefore at the high level. On the other hand, switches 12, 13, and 14 are closed in the idle state, so that the control line 2 is at the low level. When one of the units 4, 5, or 6 changes the switching state of its switch 9, 10 or 11, respectively, the level on the first control line 1 is immediately set to low. Therefore, the low level can be regarded as the dominant state on first control line 1, since it is superimposed to the high level (recessive state). On the other hand, nothing changes on second control line 2 when one of switches 12, 13, or 14 is opened because the dominant low state is maintained by the two other, non-actuated (i.e., closed) switches.

Figure 2:
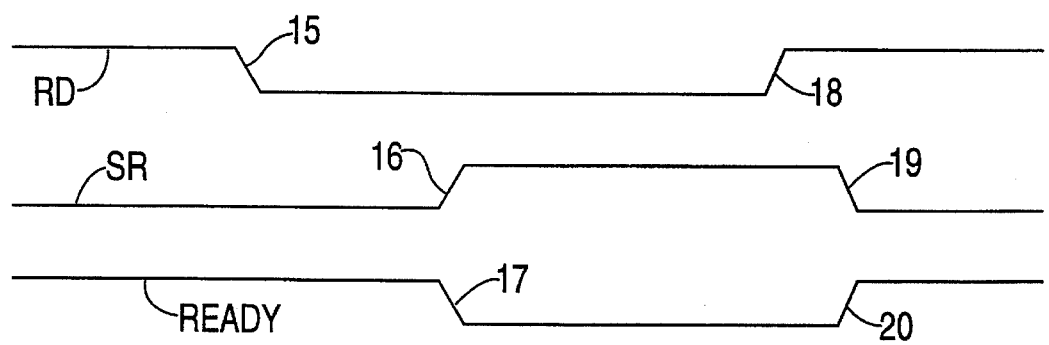
FIG. 2 is a timing diagram of relevant control signals used in the configuration of the present invention.

FIG. 2 shows a timing diagram of the Ready acknowledge signal, the system ready signal SR and read signal RD for a read cycle during a "point-to-point" access. In the idle phase (no read or write) all units maintain the system ready control signal SR at low level. With falling side 15 of read signal RD, all unaddressed units switch signal SR to high level. Addressed modules keep control signal SR at low level even after the falling side of read signal RD until the data is transmitted and received. At the time of the rising side 16 of control signal SR, the data transmission is ended. At the same time, the Ready acknowledge signal is switched to low level with falling side 17. The low level of the Ready acknowledge signal is the acknowledge information to end an access in a regular manner for the processing unit. The level of the system ready control signal SR is irrelevant in this case. A rising side 18 of read signal RD sets all the units to the idle state, as shown in FIG. 2 on the falling side 19 of system ready control signal SR and a rising side 20 of the Ready acknowledge signal.

The timing diagram of a "point-to-point" write access corresponds to the one illustrated in FIG. 2, except that the read signal RD is replaced by write signal WR. A high level of the acknowledge and the system ready control signals set simultaneously, on the first and second control lines indicates that no unit responds to the address output. This can be caused by erroneous addressing or an empty slot. In the configuration of the present invention, this state is advantageously recognized as early as 1.5 µs after the falling side of read signal RD or write signal WR.

For units that do not have a second control line for the control signal SR, an adaptation device can be attached between such units and the bus system. This adaptation device generates the system ready control signal SR through a timer whose operating time must exceed that of the longest access cycle. The system ready control signal SR is interrupted as soon as the adaptation device detects a low level of the Ready acknowledge signal. If such a unit is removed from the adaptation device and an access takes place, the access can only be interrupted after the operating time of the timer. The adaptation device ensures compatibility of the new configuration with previously available units.

Interface modules, used for attaching expansion devices to central devices, keep the system ready control signal SR at low level in instances of access to units in an expansion device until the farthest removed unit has received the read or write signal in its attachment lines and retransmitted its control signal back to the central device. The time required corresponds to twice the maximum signal transmission time in the attachment line. The interface module determines the required time information from its individual line timing or information on the cable length of the units.

Control signal SR is generated by units 4, 5, and 6 in FIG. 1 as follows:
1. If no access occurs over the bus system (i.e., the "Idle State"), each unit 4, 5, and 6 activates control signal SR by closing switches 12, 13, and 14, respectively, and deactivates the Ready acknowledge signal by opening switches 9, 10, and 11, respectively.
2. If an access occurs over the bus system, the same units that detected the access and concluded from the address that they are not affected thereby, deactivate control signal SR by opening switches 12, 13, or 14.
3. Units that have detected the access and concluded from the address that they are affected thereby, deactivate control signal SR by opening their switches just only after they have concluded the reaction to this access.

In the case of an inactive system ready control signal SR, all the units 4, 5, and 6 have detected the access according to the system ready control signal. On the other hand, in the case of an active control signal SR, there is at least one unit 4, 5, or 6 that has not yet concluded its reaction to the access.

Through the combined analysis of the Ready acknowledge signal and system ready control signal SR, the processing unit 3 can conclude the following regarding the state of the configuration:
1. If Ready is inactive and SR active, the access is not yet completed.
2. If Ready is active, then the access is completed and at least one of units 4, 5, or 6 has responded. The level of control signal SR is not relevant in this case.
3. If the Ready and SR signals are inactive, all units 4, 5, and 6 have detected the access, but did not treat it as relevant. This case corresponds to all erroneous addressing or an access to a non-existent unit.

In the case of simultaneous access to more than one unit 4, 5, or 6, only the system ready control signal SR must be analyzed by processing unit 3. An access lasts as long as the system ready control signal SR is active. The access is indicated as being completed as soon as control signal SR has been switched to become inactive, since all the slave units were either uninterested in the access or have completed their reaction to the access.

Optimum reaction time is advantageously ensured by the configuration of the present invention for both "point-to-point" and multipoint accesses. Erroneous addressing or access to a non-existing unit is detected in the shortest possible time, since the process adapts to the propagation times existing in the actual system. If a processing unit 3 write accesses several units with different propagation times and all the addressed units acknowledge the receipt of the written information with the system ready control signal SR, then the processing unit 3 can be certain that the information has safely arrived at all (the memory devices of) the units by checking the system ready control signal SR for high level. In this case, a quasi-synchronous bus access occurs in the shortest possible time, since the process adapts to the propagation times existing in the actual system.

In the configuration of the present invention, access occurs synchronously with the propagation time jitter between any two addressed units always being smaller than or equal to the maximum signal propagation time within the configuration.

We claim:

1. A system for data transfer with a parallel bus system including an address bus, a data bus, and a control bus., the system comprising:

a) a plurality of units;

b) a first control line, interfacing with the several units, for transmitting an acknowledge signal, with which one or more of the plurality of units addressed by a first unit acknowledge accesses during access cycles; and c) a second control line for transmitting a control signal with which the one or more of the plurality of units indicate to the first unit whether an interfacing unit is being addressed, wherein the control signal has dominant and recessive states and wherein all of the plurality of units generate a dominant state outside the access cycles but only the one or more of the plurality of units addressed by the first unit generate the dominant state during the access cycles.

2. The system of claim 1, wherein the acknowledge signal has dominant and recessive states, and the one or more of the plurality of units addressed by the first unit generate a dominant state as an acknowledgement during the access cycles, and generate a recessive state in other instances.

3. The system of claim 1 wherein the plurality of units are modules in a subrack.

4. The system of claim 1 wherein the plurality of units are modules in a plurality of subracks and the second control line runs to all the subracks.

5. The system of claim 3 further comprising modules that cannot generate a control signal, the modules being connected to the parallel bus system through an adaptation device for generating a control signal, which maintains the dominant state when an acknowledgment appears and otherwise assumes the recessive state with a delay at least equal to a longest duration of an access cycle.

6. The system of claim 1 wherein the second control line is provided with a pull-up resistor wherein the units are connected to the second control line with an open collector output.

7. In an automation device, a system for data transfer with a parallel bus system including an address bus, a data bus, and a control bus, the system comprising:

a) a plurality of units;

b) a first control line, interfacing with the several units, for transmitting an acknowledge signal, with which one or more of the plurality of units addressed by a first unit acknowledge accesses during access cycles; and c) a second control line for transmitting a control signal with which the one or more of the plurality of units indicate to the first unit whether an interfacing unit is being addressed, wherein the control signal has dominant and recessive states, and wherein all of the plurality of units generates a dominant state outside the access cycles but only the one or more of the plurality of units addressed by the first unit generate the dominant state during the access cycles.

* * * * *